March 14, 1950     R. LEE     2,500,191
COMPENSATED ELECTRIC MOTOR
Filed Nov. 19, 1945
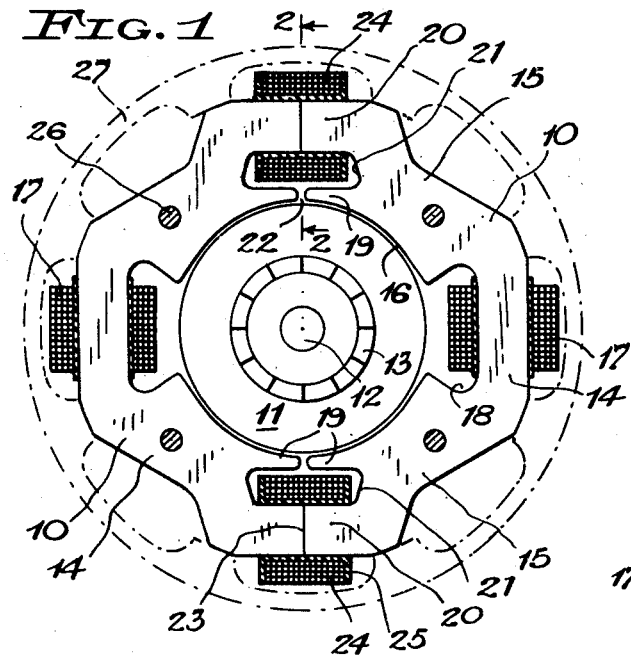
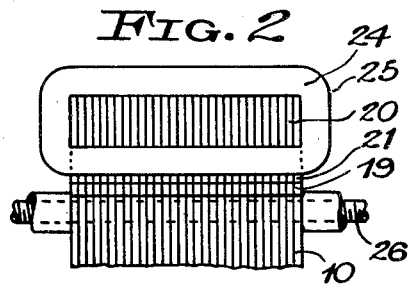
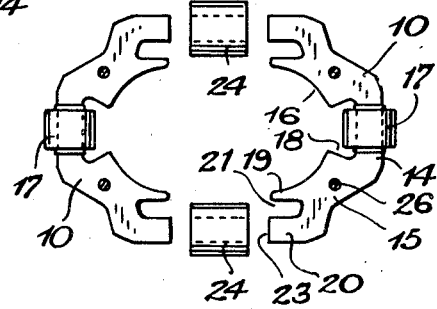
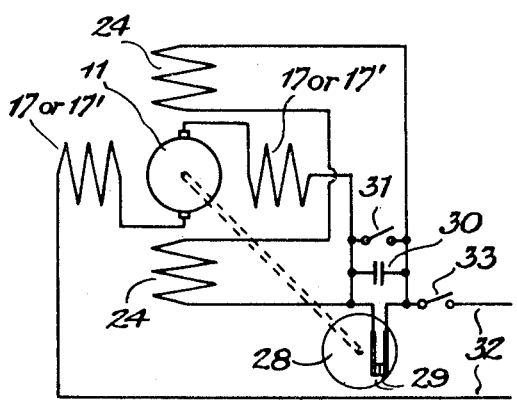
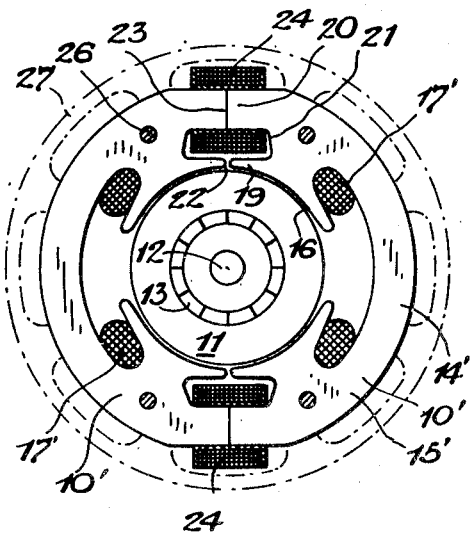
INVENTOR
ROYAL LEE
BY Christopher L. Waal
ATTORNEY Patented Mar. 14, 1950

2,500,191

UNITED STATES PATENT OFFICE 2,500,191

COMPENSATED ELECTRIC MOTOR

Royal Lee, Elm Grove, Wis.

Application November 19, 1945, Serial No. 629,567

9 Claims. (Cl. 318—325)

The present invention relates to compensated electric motors and is particularly applicable to motors of fractional horsepower.

An object of the invention is to provide an improved and efficient electric motor having a compensating winding which cooperates with a speed-regulating switch associated with the motor.

Another object is to provide a motor in which the compensating winding forms a shunt for the speed-regulating switch and affords inductive compensation when the switch is closed.

Still another object is to provide a compensated motor having a simple and inexpensive field structure.

A further object is to provide an electric motor permitting the use and easy application of form-wound compensating coils of simple design.

The invention further consists in the several features hereinafter described and claimed.

In the accompanying drawing, illustrating certain embodiments of the invention,

Fig. 1 is an end elevation of an electric motor constructed in accordance with the invention, parts being broken away and parts being shown in section;

Fig. 2 is a detail sectional view taken generally on the line 2—2 of Fig. 1;

Fig. 3 is an exploded view of the motor field structure;

Fig. 4 is a view similar to Fig. 1 but showing a modified form of motor, and

Fig. 5 is a schematic wiring diagram for each form of motor.

Referring to the form of motor shown in Figs. 1 to 3 of the drawing, 10 designates complementary half-sections of a magnetizable stator or field core, preferably of laminated construction, and 11 designates a rotatable armature cooperating with the stator core and carried on a shaft 12. The armature is of conventional construction and is provided with the usual commutator 13. The stator core is of generally annular form, and each half-section 10 thereof is U-shaped and comprises a medial yoke portion 14 and a pair of leg portions 15, the latter having concave pole faces 16 at their inner sides. The yoke portion of each core section carries a field coil 17 which extends in a peripheral direction and is accommodated in a notch 18 formed at the inner side of the yoke portion. Each field coil is readily wound on the U-shaped core section. The two field coils are substantially identical, and in the case of the two-pole motor illustrated these coils are so arranged that the adjacent leg portions of the two stator core sections have the same polarity. The pole faces 16 are adjacent to the armature and are preferably chamfered near the field coils. The assembled stator core presents opposed poles each of which is formed by adjacent legs of the two stator sections. The end of each stator core leg portion 15 is forked to form inner and outer tongues 19 and 20 separated by a notch 21, the inner tongue 19 being relatively thin and presenting a part of the pole face 16. The free ends of the adjacent inner tongues of the assembled stator sections are aligned and in proximity to each other at the polar axis, and the associated tongue ends are separated by a short air gap 22 which provides a region of high reluctance, this gap preferably being at least as large as the armature air gap and desirably about twice the armature air gap. Each outer tongue 20 of the stator core has approximately the same cross-sectional area as the yoke portion 14, and the free ends of adjacent tongues 20 are flat and preferably in abutment, each tongue end being ground to provide a flat abutment surface 23. Each pair of aligned tongues 20 are surrounded by a compensating coil 24 which is accommodated in the axially extending opening formed by the notches 21, each coil being wound on an insulating bobbin 25 which is adapted to receive therein the ends of the associated tongues 20 during the assembly of the two stator sections, as indicated in Fig. 3. The two compensating coils are substantially identical and are connected in circuit as hereinafter described.

The laminated stator core sections are carried by studs or rods 26 extending through the legs of the core sections parallel to the motor shaft. The assembled stator core may be mounted in a suitable housing 27.

In its preferred form, the motor is arranged as a series motor with the two field coils 17 connected in series with the armature 11, as shown in Fig. 5, and the speed of the motor is controlled or governed by a suitable speed-regulator or governor 28 such as the general type disclosed in my United States Letters Patent No. 1,767,146 for Variable speed electric motor switch, dated June 24, 1930. The governor is driven by the motor shaft and includes a pair of separable switch contacts 29 which open and close at a high-frequency, such as 50 to 500 cycles per second, during the rotation of the motor. In the present instance the governor switch is included in the load circuit of the motor and is shunted by the compensating winding, the coils 24 of which are preferably connected in series. The governor switch is also shunted by a condenser 30 to minimize sparking, and may further be shunted by a short-circuiting switch 31 for use when governor control is not required. The motor is here shown to be connected to supply mains 32 through a control switch 33.

The motor is normally operated on alternating current, although it is also capable of operation on direct current. For motor operation on alternating current, it is generally preferred to wind a sufficient number of turns on the compensating coils 24 to provide an impedance which will prevent rotation of the armature at no-load when the governor contacts are held open. However, a smaller number of coil turns can be used if the no-load speed under these conditions is less than the desired governor speed.

When the motor is started in operation, the governor contacts are closed and current flows through these contacts and the field and armature windings in series, causing the motor to accelerate until it attains a predetermined speed at which the governor contacts open. The motor current then drops, causing a slight decrease in motor speed, whereupon the contacts reclose and the motor speed again increases. In practice the current is interrupted at a high frequency and the motor speed remains substantially constant, even under changes of load. The condenser 30 minimizes sparking at the governor switch, and since the compensating winding is in shunt with the governor contacts it is not necessary to provide a separate resistor across this switch. During the periods when the governor switch is closed, the compensating winding is short-circuited by this switch and forms a closed secondary circuit, providing inductive compensation. When the governor switch is open, the compensating winding is connected in series with the motor, and limits the motor current.

The compensating coils are preferably so connected as to provide conductive compensation when the governor switch is open. These coils are here shown to be connected in series with each other but they may be connected in parallel instead.

The compensating winding not only minimizes armature reactance but also reduces field distortion and improves commutation and power-factor, each compensating coil producing a magnetic flux in the two halves of the associated field pole opposing the cross flux of the armature. In the event that governor control is not required the governor switch can be short-circuited by the switch 31, and in such case the short-circuited compensating winding provides inductive compensation.

The modified form of motor shown in Fig. 4 is generally similar to that of Fig. 1 except for the arrangement of the field poles and field windings. The stator core comprises a pair of complementary U-shaped half-sections 10' each having a yoke portion 14' and leg portions 15', the latter having terminal enlargements with concave inner sides 16 forming pole faces adjacent to the armature 11. The assembled stator core presents split polar projections formed by the enlarged ends of the core leg portions 15', the polar projections being surrounded by respective field coils 17'. As in the motor of Fig. 1, the end of each stator core leg is forked to form inner and outer tongues 19 and 20 separated by a notch 21, the inner tongue 19 being relatively thin and presenting a part of the pole face 16. The adjacent inner tongue ends are separated by a short air gap 22, and the ends of the adjacent outer tongues have flat abutting surfaces 23, the aligned outer tongues being surrounded by compensating coils 24, and the stator core sections being carried by studs or rods 26 extending therethrough. The motor windings are connected as in Fig. 5, and the motor operates in substantially the same manner as the motor of Fig. 1.

In each form of motor, the impedance of the coils forming the compensating winding consists largely of reactance, the ohmic resistance of this winding being relatively low.

The number of turns in each compensating coil necessary to prevent rotation of the armature at no-load will vary with the size of the motor, and the optimum value can readily be determined by trial. In many instances it will be found suitable to wind the compensating coils and field coils with about the same number of turns of wire of approximately the same gauge.

The joints between the abutting ends of the field core sections introduce some reluctance, which is desirable, particularly in the motor of Fig. 1, in order to avoid the necessity for close adjustment of the number of turns in the field coils.

What I claim as new and desire to secure by Letters Patent is:

1. An alternating current electric motor having an armature and a field core and a compensating winding on said field core in series with said armature and providing a magnetic flux opposing armature cross flux, and speed-governing switch means connected in shunt to said compensating winding and opening on attainment of a predetermined motor speed, said compensating winding having a sufficient impedance to prevent operation of the motor at the governor speed when said switch means is open, and said compensating winding when shunted by said switch means providing inductive compensation.

2. An alternating current electric motor having a field core and an armature and having a compensating winding arranged on said field core to provide a magnetic flux opposing armature cross flux, and speed-responsive switch means for short-circuiting said compensating winding to effect inductive compensation.

3. An electric motor having a field structure with a field winding and adapted to cooperate with an armature, said field structure having a polar region with a pole face and comprising complementary core sections with adjacent end portions forming said polar region and having confronting faces presenting a joint at said polar region, there being an axially extending opening through said polar region at said joint, and a compensating coil surrounding an outer portion of said field structure adjacent to said joint and extending through said opening.

4. An electric motor having a field structure with a field winding and adapted to cooperate with an armature, said field structure having a polar region with a pole face and comprising complementary core sections with adjacent end portions forming said polar region and presenting a joint at said polar region, said core end portions being forked to form confronting inner and outer tongues, said inner tongues extending toward each other along the pole face, and a compensating coil surrounding said field structure adjacent to said joint, the adjacent end portions of said outer tongues of said core sections extending into said compensating coil.

5. An electric motor having a field structure adapted to cooperate with an armature, said field structure having a split polar region with a pole face and an axially extending opening through said polar region and having aligned tongues between said pole face and said opening, said tongues extending toward each other along said pole face and forming walls of said opening, there being an air gap between the adjacent ends of said tongues, and a compensating winding extending through said opening.

6. An electric motor having a ring-like field structure adapted to cooperate with an armature, said field structure comprising a pair of complementary U-shaped core sections the adjacent end portions of which form split polar regions each presenting a divided pole face, a field winding on said field structure, and compensating coils into which parts of the adjacent end portions of said core sections extend.

7. An electric motor having a ring-like field structure adapted to cooperate with an armature, said field structure comprising a pair of complementary U-shaped core sections the adjacent end portions of which form split polar regions each presenting a divided pole face, said core section end portions having confronting faces presenting a joint at each polar region, there being an axially extending opening through said field structure at each joint, field coils on the medial portions of the respective core sections, and compensating coils into which confronting parts of the adjacent end portions of said core sections extend, said compensating coil passing through said opening.

8. An electric motor having a field structure adapted to cooperate with an armature, said field structure comprising complementary core sections having adjacent end portions forming a divided polar projection with a pole face and having confronting faces presenting a joint, there being an axially extending opening through said field structure at said joint, a field coil extending around said polar projection, and a compensating coil on the adjacent end portions of said core sections and extending through said opening.

9. An alternating current electric motor having a field core and an armature and a compensating winding on said field core connected in series with said armature and providing a magnetic flux opposing armature cross flux, and switch means for establishing a current path in shunt to said compensating winding to provide inductive compensation.

ROYAL LEE.

REFERENCES CITED

The following references are of record in the file of this patent:

UNITED STATES PATENTS

| Number | Name | Date |
| --- | --- | --- |
| 438,656 | Thompson | Oct. 21, 1890 |
| 458,646 | Thompson | Sept. 1, 1891 |
| 1,314,132 | Dorsey | Aug. 26, 1919 |
| 1,501,372 | Robinson | July 15, 1924 |
| 1,554,647 | Oswald | Sept. 22, 1925 |
| 1,641,548 | Oswald | Sept. 6, 1927 |
| 1,732,367 | Kleinschmidt | Oct. 22, 1929 |
| 1,767,146 | Lee | June 24, 1930 |